US012811352B2

(12) United States Patent
Tang et al.

(10) Patent No.: US 12,811,352 B2
(45) Date of Patent: Nov. 24, 2026

(54) CONTACT SLEEVE, CONNECTION ARRANGEMENT, SIGNAL TRANSMISSION SYSTEM, AND METHOD FOR PRODUCING A CONNECTION ARRANGEMENT

(71) Applicant: ROSENBERGER HOCHFREQUENZTECHNIK GMBH & CO. KG, Fridolfing (DE)

(72) Inventors: Hong Tang, Stockholm (SE); Fan Yang, Stockholm (SE); Anton Lindberg, Stockholm (SE); Viktor Loberg, Stockholm (SE); Werner Wild, Buttenwiesen (DE); Bernhard Aicher, Fridolfing (DE); Tobias Stadler, Fridolfing (DE); Johannes Heubeck, Fridolfing (DE); Andreas Gruber, Ainring (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 346 days.

(21) Appl. No.: 18/577,218

(22) PCT Filed: Jul. 6, 2021

(86) PCT No.: PCT/EP2021/068678
§ 371 (c)(1),
(2) Date: Jan. 5, 2024

(87) PCT Pub. No.: WO2023/280390
PCT Pub. Date: Jan. 12, 2023

(65) Prior Publication Data

US 2024/0250485 A1 Jul. 25, 2024

(51) Int. Cl.
*H01R 24/50* (2011.01)
*H01R 24/42* (2011.01)
(Continued)

(52) U.S. Cl.
CPC ............. *H01R 24/50* (2013.01); *H01R 24/42* (2013.01); *H01R 43/20* (2013.01); *H01R 2103/00* (2013.01)

(58) Field of Classification Search
CPC ........ H01R 24/50; H01R 24/42; H01R 43/20; H01R 2103/00
(Continued)

(56) References Cited

U.S. PATENT DOCUMENTS 7,189,113 B2 * 3/2007 Sattele ............... H01R 13/6277 439/578
7,927,144 B2 * 4/2011 Feldman ............ H01R 13/6585 439/607.05
(Continued)

FOREIGN PATENT DOCUMENTS

DE 102016006923 A1 12/2017
EP 3595093 A2 1/2020
(Continued)

OTHER PUBLICATIONS

International Search Report and Written Opinion issued in App. No. PCT/EP2021/068678, mailing date Mar. 23, 2022, 15 pages.

*Primary Examiner* — Gary F Paumen
(74) *Attorney, Agent, or Firm* — Koffsky Schwalb LLC

(57) ABSTRACT

Contact sleeve (13) for insertion into a recess (12) of a housing (11) of an electrical apparatus (5), comprising a lateral inner contact surface (21) and a face sided outer contact surface (17). The inner contact surface (21) is configured to make an electrical contact with an outer conductor (4) of an electrical plug-in connector (7). The outer contact surface (17) is configured to make an electrical contact with the housing (11) of the electrical apparatus (5) via a stop surface (16) inside the recess (12).

20 Claims, 3 Drawing Sheets

Figure 1:
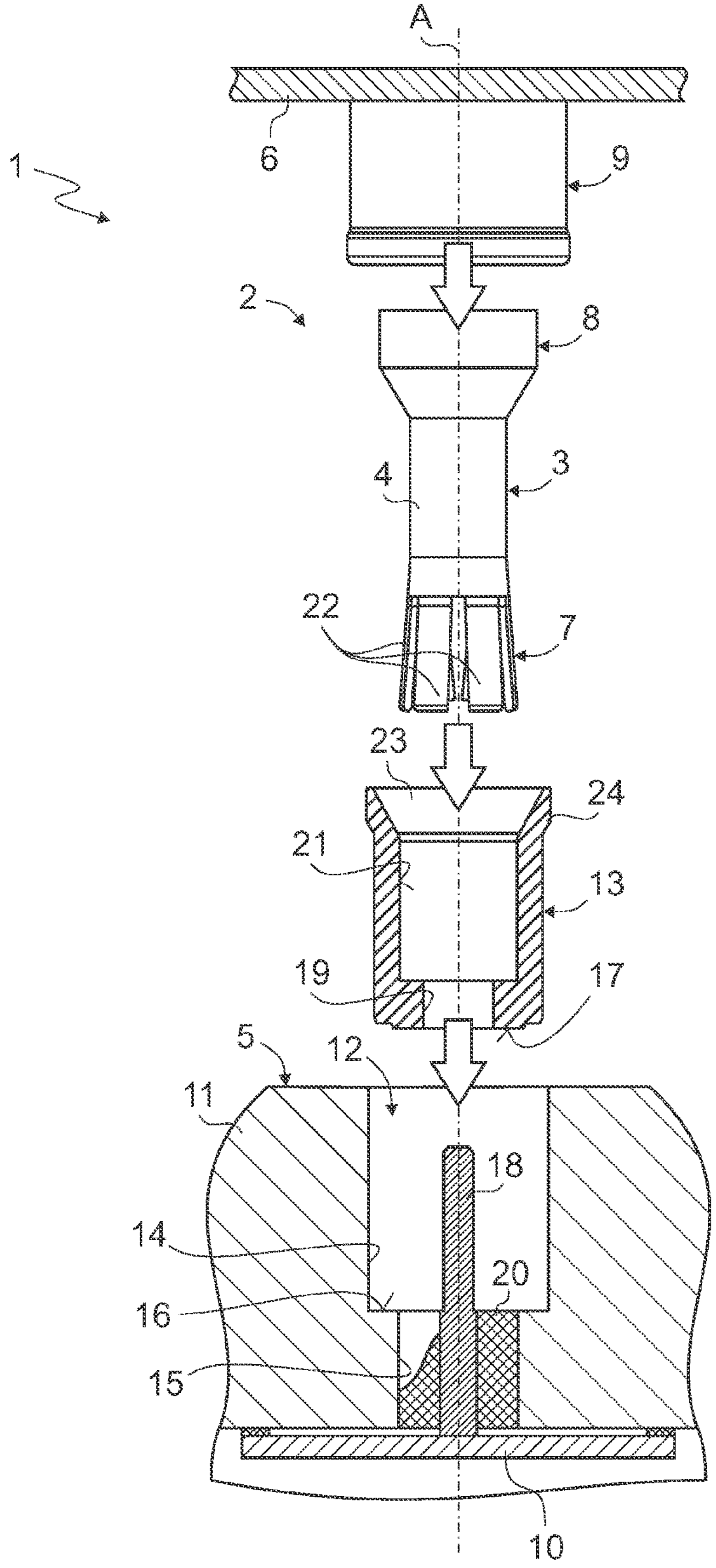

(51) Int. Cl.
*H01R 43/20* (2006.01)
*H01R 103/00* (2006.01)

(58) Field of Classification Search
USPC ...................... 439/578, 63, 581, 579, 607.05
See application file for complete search history.

(56) References Cited

U.S. PATENT DOCUMENTS

| | | | | |
|---|---|---|---|---|
| 7,997,933 | B2 * | 8/2011 | Feldman | H01R 13/6583 439/607.05 |
| 8,936,485 | B2 * | 1/2015 | Gessford | H01R 13/187 439/578 |
| 11,108,199 | B2 | 8/2021 | Thomas | |
| 11,251,551 | B2 | 2/2022 | Gruber | |
| 2006/0099853 | A1 | 5/2006 | Sattele | |
| 2007/0197095 | A1 * | 8/2007 | Feldman | H01R 13/432 439/607.05 |
| 2016/0254608 | A1 * | 9/2016 | Takahashi | C25D 3/38 439/886 |
| 2020/0021049 | A1 * | 1/2020 | Song | H01R 13/6594 |
| 2020/0091636 | A1 * | 3/2020 | Gruber | H01R 31/06 |
| 2020/0235534 | A1 * | 7/2020 | Lödding | H01R 13/6581 |
| 2020/0259282 | A1 * | 8/2020 | Song | H01R 12/7082 |
| 2020/0373694 | A1 * | 11/2020 | Gruber | H01R 43/18 |
| 2021/0143596 | A1 * | 5/2021 | Jung | H01R 35/00 |

FOREIGN PATENT DOCUMENTS

| | | | |
|---|---|---|---|
| EP | 3627636 | A1 | 3/2020 |
| EP | 3819993 | A1 | 5/2021 |
| GB | 2267398 | A | 12/1993 |

* cited by examiner

CONTACT SLEEVE, CONNECTION ARRANGEMENT, SIGNAL TRANSMISSION SYSTEM, AND METHOD FOR PRODUCING A CONNECTION ARRANGEMENT

The invention relates to a contact sleeve for insertion into a recess of a housing of an electrical apparatus, comprising a lateral inner contact surface and a face sided outer contact surface.

The invention also relates to a connection arrangement, comprising a contact sleeve and an electrical apparatus.

Furthermore, the invention relates to a signal transmission system and to a method for producing a connection arrangement.

It is sometimes necessary to connect different electrical circuits to one another, in order to provide a wired communication link, e. g., between adjacent electrical modules and/or printed circuit boards (PCBs). Various possibilities are known for the electrical connection between PCBs, including unshielded connectors, wire strands and ribbon cables. Such connections are also known as "board-to-board" connections. However, the conventional connectors are often not suitable for achieving high data rates.

In order to electrically connect two PCBs to one another, or to connect a PCB to an electrical apparatus, coaxial connection elements, comprising respective plug-in connectors on each end, can be used to transmit signals with high data rates and sufficiently high signal quality. A coaxial intermediate piece between the plug-in connectors, also known as "adapter", bridges the distance between the plug-in connectors in order to enable the communication link. The plug-in connectors can be connected to corresponding mating connectors attached to the PCB and/or to a housing of the electrical apparatus. Therefore, the mating connector is usually soldered or pressed onto the circuit board and is electrically connected to its microstrip lines. As an alternative, the mating connector may also be mounted into a bore of a housing of the electrical apparatus. Such a connection arrangement and some further technical background is described in EP 3 627 636 A1, for example.

Between a PCB and a radio-frequency (RF) component, e. g., between an antenna and a filter module, an RF connection can be required. Such an RF interconnection has often to deal with mechanical tolerances, due to high demands for miniaturization. Manufacturing tolerances of the connectors, combined with abrasion due to frequent mating cycles might even lead to contact losses. In addition, an RF interconnection has to provide proper shielding, and sufficient electrical properties, such as low return loss, and low insertion loss. With the known arrangements, communication links with RF-frequencies above 5 GHz, especially above 8 GHz, are difficult, if not impossible, to achieve.

The object of this invention is to present a contact sleeve in order to enhance the mechanical and/or electrical connection between an electrical apparatus and an electrical plug-in connector, preferably for RF signal transmission.

It is also an object of this invention to present a connection arrangement and a signal transmission system being suitable for enhanced mechanical and/or electrical connectability, preferably for RF signal transmission.

In addition, it is an object of the invention to present a method for producing an enhanced connection arrangement, preferably with high suitability for RF signal transmission.

With regard to the contact sleeve, the object is fulfilled by the features disclosed below. Relating to the connection arrangement, the object is fulfilled by the features disclosed below, and relating to the signal transmission system by the features disclosed below. Regarding the method for producing a connection arrangement, the object is fulfilled by the features disclosed below.

According to the invention, a contact sleeve for insertion into a recess of a housing of an electrical apparatus comprises a lateral inner contact surface and a face sided outer contact surface.

Preferably, the sleeve is ring-shaped (completely closed along the perimeter). However, the sleeve can also be only partially ring-shaped (partially closed along the perimeter).

The sleeve may have an inner shell surface and an outer shell surface. The inner shell surface comprises the lateral inner contact surface. It should be mentioned that the lateral inner contact surface can also match only a partial area of the inner shell surface. The sleeve may also have more than one inner contact surface. In particular, several inner contact surfaces can be distributed on the inner shell surface of the sleeve.

According to the invention, the inner contact surface is configured to make an electrical contact with an outer conductor of an electrical plug-in connector.

The sleeve may have a first end and a second end, wherein the sleeve can be inserted into the recess with its first end. Thus, the second end faces away from the housing of the electrical apparatus after the sleeve is inserted into the recess. The first end of the sleeve may have the face sided outer contact surface.

According to the invention, the face sided outer contact surface is configured to make an electrical contact with the housing of the electrical apparatus via a stop surface inside the recess.

The stop surface may be a surface inside the recess facing the face sided outer contact surface of the sleeve after the sleeve is inserted into the recess. Preferably, the stop surface inside the recess and the outer contact surface of the sleeve run parallel to each other after the sleeve is inserted into the recess. However, the stop surface can also be a curved or tapered surface. In particular, the stop surface can have a component in axial direction of the contact sleeve, i. e., in plug-in direction. Most preferably, the stop surface inside the recess contacts the outer contact surface of the sleeve mechanically and electrically after the sleeve is inserted into the recess.

Thus, the contact sleeve can be used to transform a radial contact between the sleeve and the outer conductor of the plug-in connector into an axial, face sided contact between the sleeve and the housing of the electrical apparatus.

It is an advantage of the invention that no counterpart connector for the plug-in connector needs to be mounted into the housing. It is only required to insert the simple contact sleeve into the recess. The contact sleeve can, e. g., be inserted and fixed inside the recess during manufacturing of the electrical apparatus or its housing, thus even before the actual assembly process in the field.

It is another advantage of the invention that a rough preciseness of the recess can be converted and reduced into a fine preciseness, as the contact sleeve can be manufactured with much better precision on the inside than the inside of the recess in the housing of the electrical apparatus. Thus, the electrical assembly can be more robust, abrasion due to frequent mating cycles can be reduced, and also the electrical properties can be improved, which makes the invention especially suitable for RF signal transmission. However, the proposed contact sleeve and electrical assembly is still applicable for mass-volume production.

In an embodiment of the invention, the inner shell surface and/or the lateral inner contact surface is a plane cylindrical surface with constant inner diameter. This can be beneficial for applications that require frequent plugging and unplugging, in order to prevent abrasion. The walls of the contact sleeve may be made of a rigid material.

The inner shell surface and/or the lateral inner contact surface may be completely plane in axial direction of the contact sleeve. However, the lateral inner contact surface and/or the inner shell surface may also be only partially plane.

The lateral inner contact surface and/or the inner shell surface may provide recesses, grooves, protrusions, changes in the cross section (like an extension or a tapering), etc.

According to an advantageous embodiment of the invention, the lateral inner contact surface comprises an undercut, preferably a ring-shaped undercut. This can allow the plug-in connector or its outer conductor to snap into place in order to mechanically secure the connection, e. g., by means of spring tabs or latching lugs which are arranged on the outer surface of the outer conductor.

According to another advantageous embodiment of the invention, the contact sleeve comprises at least one spring tab, wherein the lateral inner contact surface is arranged on the at least one spring tab. This configuration can allow to mechanically secure the connection between the contact sleeve and the plug-in connector, e. g., by a force-fit with an outer shell surface of the outer conductor. However, the outer shell surface of the outer conductor may optionally even comprise respective recesses, undercuts or the like, to provide a snap-in connection together with the spring tabs of the contact sleeve.

The at least one spring tab may be attached to the inner shell surface of the contact sleeve at one end. Preferably, the at least one spring tab emerges from the inner shell surface, and is one piece with the inner shell surface of the contact sleeve.

The other end of the spring tab may be a free end, being elastically movable in a radial direction. The free end of the spring tab preferably faces away from the stop surface of the recess (thus, facing towards the opening of the recess), but can also face the stop surface in some applications.

However, also both ends of the spring tab can be fastened to the inner shell surface or merge integrally into the inner shell surface. In this case, a section between both ends may be formed in the direction of the central axis of the contact sleeve.

According to an embodiment, the contact sleeve comprises a plurality of spring tabs which are circularly arranged inside the contact sleeve, wherein the inner contact surface is arranged and distributed over the plurality of spring tabs. In this case, the contact sleeve may be designed in the form of a spring cage or may comprise a spring cage.

A regular distribution of the spring tabs within the contact sleeve can provide an advantageous distribution of forces when plugging and unplugging the plug-in connector. In principle, any number of spring tabs can be provided, for example two spring tabs, three spring tabs, four spring tabs, five spring tabs, six spring tabs, or even more spring tabs.

According to an embodiment of the invention, the cross-sectional area of the contact sleeve is reduced in the face sided outer contact surface. Hereby, the contact pressure can be increased without the need to also increasing the pressure for mounting the contact sleeve into the recess. As a result, the electrical properties of the connection can be improved, since the contact resistance is reduced due to the higher contact pressure.

In an embodiment of the invention, the face sided outer contact surface has a through-hole for providing a passage to the inside of the housing. The passage may be configured to allow an inner conductor of the electrical apparatus to pass through, in order to make it possible for an inner conductor contact element of the electrical plug-in connector (e. g., a socket of the plug-in connector) to connect to the inner conductor of the electrical apparatus which is made accessible inside the contact sleeve. Likewise, the passage may also be configured to allow the inner conductor contact element of the plug-in connector to pass through, e. g., in order to connect to a socket of the electrical apparatus.

In particular, a coaxial electrical connection can be provided. However, the through-hole does not necessarily have to be coaxial within the contact sleeve.

The through-hole can be provided by a bore through a closed end (first end) of the contact sleeve. However, the through-hole can also be provided if the first end of the contact sleeve is not closed at all.

It should be noted, that the proposed invention may also be intended to provide only an outer conductor connection, thus a through-hole or inner conductor is not necessarily provided. In principle, the contact sleeve may even be suitable for making a connection with a waveguide of the plug-in connector, in order to enable the transmission of electromagnetic waves between the electrical apparatus and the plug-in connector.

Multiple through-holes may also be provided, e. g., to allow multiple inner conductors to pass through.

It shall be emphasized that the contact sleeve does not provide the inner conductor, but is only intended to provide means for contacting the inner conductor of the electrical apparatus with the inner conductor contact element of the plug-in connector.

The cross-section of the contact sleeve can be designed for providing an impedance-matched transmission between the electrical apparatus and the electrical plug-in connector. For example, the cross-section of the contact sleeve can be adapted accordingly, based on simulations and/or measurements.

In an embodiment of the invention, the contact sleeve has a hexagonal flange at an end opposite to the face sided outer contact surface (i. e., at the second end). In this way, an assembly tool can be connected to the contact sleeve, for example to screw the contact sleeve into the recess. However, the flange does not necessarily need a hexagonal form, as other geometries to transfer a torque of the assembly tool to the contact sleeve may also be possible.

In an embodiment of the invention, the contact sleeve has a funnel-shaped insertion section for the insertion of the electrical plug-in connector. In particular, the inner cross-section of the contact sleeve may decrease/may be tapered from the second end of the contact sleeve toward the first end. Also, the at least one spring tab may be shaped accordingly, if present.

In an embodiment of the invention, the contact sleeve is made in one piece. For example, the contact sleeve can be made of sheet metal which is shaped into the ring shape or into the part-ring shape.

According to an embodiment of the invention, the contact sleeve is made of metal, preferably of brass, bronze or steel. However, also other metals/materials can be possible. It can even be possible to use plastic or some dielectric material if the contact sleeve is coated with an electrically conductive material at the lateral inner contact surface, at the face sided outer contact surface, and between the contact surfaces.

According to an advantageous embodiment of the invention, the contact sleeve is coated with a coating material that has a higher conductivity than the base material of the contact sleeve. For example, the coating material can be a trimetal, silver, gold, or any other high conductivity metal. Thereby, the electrical properties and/or the mechanical robustness of the contact sleeve can be advantageously modified.

According to an advantageous embodiment of the invention, an outer shell surface of the contact sleeve is configured to be mechanically connected to the inner surface of the recess of the contact sleeve. Thereby, it can be possible to mechanically fix the contact sleeve inside the recess, e. g., by an interference fit, a threaded connection, or adhesion, as mentioned below.

The invention also relates to a connection arrangement, comprising the contact sleeve according to the present description, and the electrical apparatus. Preferably, an electrical circuit of the electrical apparatus is arranged inside the housing of the electrical apparatus.

The electrical circuit can be arranged on one PCB or can be distributed over several PCBs and/or electronic components (like capacitors, coils, resistors, etc.), which are at least partially arranged within the housing. The electrical circuit can also comprise one application-specific integrated circuit (ASIC) or several ASICs or so-called lumped elements. The electrical circuit may also be realized as or comprise one or more stand-alone components, i. e., a metallic structure (e. g., of the housing of the electrical apparatus itself) whose geometry is designed by recesses, protrusions, additional elements etc. in such a way that specific transmission characteristics for high-frequency technology applications result. The circuit can thus also extend over the housing and/or any other structures, thus representing a kind of extended circuit.

In an embodiment of the invention, the housing of the electrical apparatus is made of metal or is coated with metal. Preferably, the housing is connected to an electrical reference potential, for example ground. The housing may form an electromagnetic shielding for the electrical circuit.

In an embodiment of the invention, the electrical circuit comprises a radio-frequency component, preferably a filter module, an amplifier module, or a directional coupler module. Also, combinations of several RF modules are possible. In general, the invention shall not be limited to RF technology but can be applicable with any electrical circuits/modules.

The recess of the housing can be a bore. If only a single contact shall be provided, i. e., an electrical connection between the housing and the outer conductor of the plug-in connector, the bore is preferably a blind hole. However, the bore can also be a through-hole.

In a preferred embodiment of the invention, the recess of the housing is a stepped bore, with a first bore section for insertion of the contact sleeve and a second bore section for providing a mechanical passage to the electrical circuit.

Preferably, the first bore section has a larger diameter than the second bore section, wherein the stop surface can be a step between the first bore section and the second bore section. Thus, the face sided outer contact surface of the contact sleeve can mechanically and electrically connect to the step between the bore sections. Note that although only two bore sections are mentioned here, even more than two bore sections can of course be provided, for example three bore sections, four bore sections or even more bore sections.

The fully inserted contact sleeve can safely rest on the step. Thus, the step/the stop surface inside the recess may act as an end stop for the contact sleeve, especially for the face sided outer contact surface of the contact sleeve.

The passage through the bore into the housing can be used to pass contact elements through and thus make them accessible inside the contact sleeve, e. g., for mechanical and electrical connection with the plug-in connector. The passage can also be used as waveguide.

According to an advantageous embodiment of the invention, the electrical apparatus comprises an inner conductor, the inner conductor being connected to the electrical circuit and coaxially protruding through the second bore section into the first bore section. Thus, the plug-in connector, preferably a coaxial plug-in connector, can be connected to the inner conductor.

In an embodiment of the invention, the electrical apparatus comprises a dielectric material, the dielectric material being housed inside the second bore section, wherein the inner conductor is coaxially guided through the dielectric material.

Preferably, the contact sleeve does not provide a dielectric material. However, it is possible (but not preferred) to guide the dielectric material of the electrical apparatus through the second bore section into the contact sleeve.

According to an embodiment of the invention, the fully inserted contact sleeve protrudes from the recess of the housing. This is particularly advantageous when the contact sleeve has to pressed into the recess using a pressing tool. Thus, it can be ensured that the contact sleeve is fully insertable into the recess, even in case of large manufacturing tolerances.

However, it is also possible that the contact sleeve is flush with the surface of the housing in its fully inserted state. In special cases, the contact sleeve may even be recessed in the recess when fully inserted. However, special pressing tools might be required for these configurations.

In an embodiment of the invention, the contact sleeve is fixed inside the recess by an interference fit or press fit. For this purpose, the contact sleeve can have one or more projections on the outside which can be pressed into the recess of the housing for fixing the contact sleeve inside the recess in a force-fit manner. However, the outer surface of the contact sleeve can also be pressed into the recess over its entire surface.

According to another advantageous embodiment of the invention, the contact sleeve is fixed inside the recess by a threaded connection. The contact sleeve may have an external thread on its outer surface that extends over the full axial length of the contact sleeve or at least over a portion of the axial length of the contact sleeve. The recess may have a corresponding internal thread. As already mentioned, the contact sleeve may have a flange or the like, maybe even some sort of screw head, in order to transmit the torque of a screwdriving tool to the contact sleeve.

According to another advantageous embodiment of the invention, the contact sleeve is adhesively fixed inside the recess. The contact sleeve can, for example, be glued into the recess, e. g., by means of a conductive adhesive (especially a silver conductive adhesive), or soldered into the recess.

In an embodiment of the invention, the connection arrangement further comprises the electrical plug-in connector.

The plug-in connector is preferably a coaxial connector, comprising the outer conductor and an inner conductor, and optionally a dielectric between the inner conductor and the outer conductor. Preferably, the plug-in connector is arranged at one end of a rigid, tubular connecting element, in particular of the connecting element as mentioned below. However, the plug-in connector can also be a cable connector.

Preferably, the fully inserted plug-in connector does not rest on an end stop inside the contact sleeve, e. g. on a step between the inner shell surface and the through-hole for the inner conductor of the electrical apparatus. Thus, the fully inserted plug-in connector can be displaced from any component inside the contact sleeve that could act as an end stop for the plug-in connector. Most preferably, the fully inserted plug-in connector is arranged approximately axially in the center of the contact sleeve.

According to an embodiment of the invention, the outer conductor of the plug-in connector is secured inside the contact sleeve by frictional locking. This can be made possible in particular by one or more spring tabs or other elastic elements arranged on the outer conductor of the connector and/or on the inside of the contact sleeve in order to provide a force-locking mechanical fixation of the connector via the respective spring force. Preferably, the contact sleeve comprises a "smooth bore" for insertion of the outer conductor with its spring tabs.

According to an embodiment, the outer conductor comprises at least one spring tab, preferably several spring tabs, which are circularly arranged around the outer conductor, to provide the frictional locking between the outer conductor and the contact sleeve. In principle, any number of spring tabs can be provided, for example two spring tabs, three spring tabs, four spring tabs, five spring tabs, six spring tabs, or even more spring tabs.

The at least one spring tab may be attached to the outer shell surface of the outer conductor at one end. Preferably, the at least one spring tab emerges from the outer shell surface of the outer conductor, and is one piece with the outer conductor. The other end of the spring tab may be a free end, being elastically movable. The free end of the spring tab preferably faces in the plug-in direction of the plug-in connector, but can also face away from the plug-in direction in some applications. However, also both ends of the spring tab can be fastened to the outer conductor. In this case, a section between both ends may be formed in the direction away from the central axis of the outer conductor.

According to another advantageous embodiment of the invention, the outer conductor comprises at least one latching protrusion to provide a form-fit with the undercut of the inner contact surface of the contact sleeve for securing the outer conductor inside the contact sleeve. Of course, also a reverse variant is possible, wherein the outer conductor comprises the undercut (or the like) and the contact sleeve provides the protrusion. Thus, the outer conductor and the contact sleeve may provide a mutual latching connection. Preferably, the contact sleeve comprises a "detent bore" for insertion of the outer conductor.

According to an embodiment of the invention, the connection arrangement further comprises a connecting element for connecting the electrical apparatus to a printed circuit board, wherein the electrical plug-in connector is arranged at a first end of the connecting element for making connection to the electrical apparatus, and wherein the connecting element comprises a secondary connector at a second end for making connection to a counterpart connector of the printed circuit board.

The secondary connector and/or the counterpart connector may preferably be configured as proposed in EP 3 627 636 A1, which is hereby incorporated by reference. However, the secondary connector and the counterpart connector may have any configuration—the invention shall generally not be limited to any specific connector type of any of the mentioned connectors.

The invention also relates to a signal transmission system, comprising the connection arrangement according to the present description, the counterpart connector, and the printed circuit board.

The invention is particularly suitable for board-to-board and board-to-module RF inter-connect solutions, especially for active MIMO (Multiple Input Multiple Output) antennas and radios, e. g., for 5G radio interconnections. The proposed signal transmission system has outstanding electrical performance, is a low-cost design and shows high mechanical stability. The components can be designed small, with reduced radial and axial misalignment issues, but still allowing for fast and easy connection and disconnection.

The invention also relates to a method for producing a connection arrangement, comprising at least the following steps:

providing a contact sleeve with a lateral inner contact surface and a face sided outer contact surface, the inner contact surface being configured to make an electrical contact with an outer conductor of an electrical plug-in connector; and inserting the contact sleeve into a recess of a housing of an electrical apparatus, such that the outer contact surface makes an electrical contact with the housing of the electrical apparatus via a stop surface inside the recess.

The method may also comprise steps for producing the contact sleeve or any other components of the connection arrangement.

Features that have already been described in connection with the contact sleeve can readily also be applied to the connection arrangement, the signal transmission system, or the method for producing a connection arrangement—and vice versa.

It is additionally stated that terms, such as "comprising", "having" or "employing" do not exclude further features. Furthermore, it is mentioned that terms as "a" or "the", suggesting a single feature, are not meant to exclude a plurality of such features.

Embodiments of the invention will be described in more detail below with reference to the drawings. The figures of the drawings show preferred embodiments in which individual features of the present invention are illustrated in combination with one another. Features of one embodiment can also be implemented in a manner detached from the other features of the same embodiment and can readily combined by a person skilled in the art with features of other embodiments to form further expedient combinations and subcombinations. Functionally identical elements are provided with the same reference symbols in the figures of the drawings.

Figure 2:
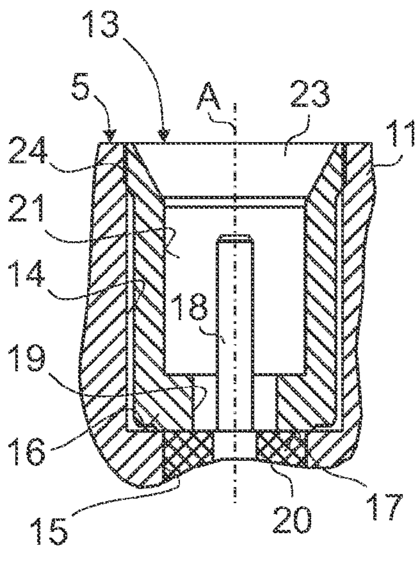
Figure 3:
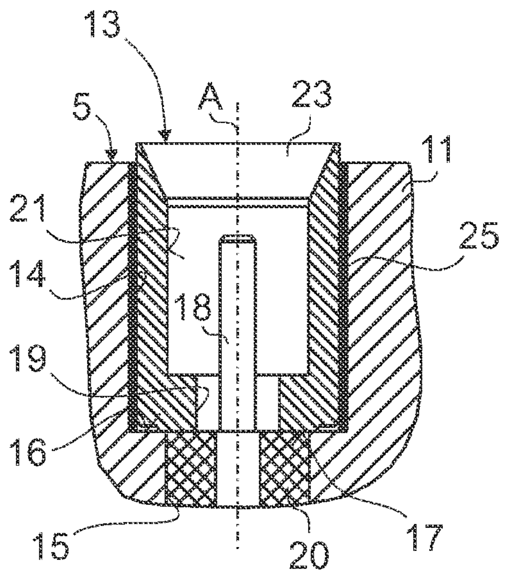
Figure 4:
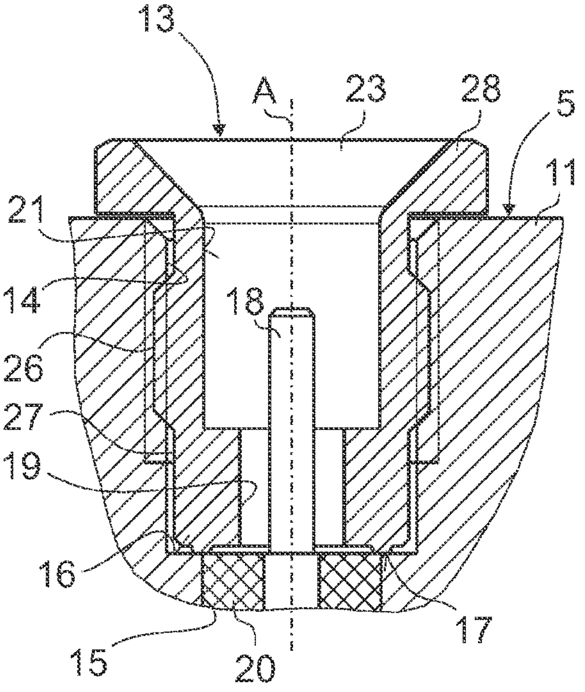
Figure 5:
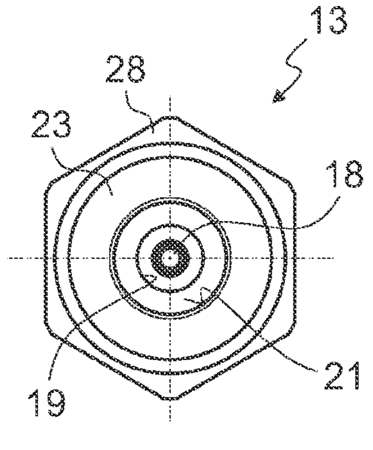
Figure 6:
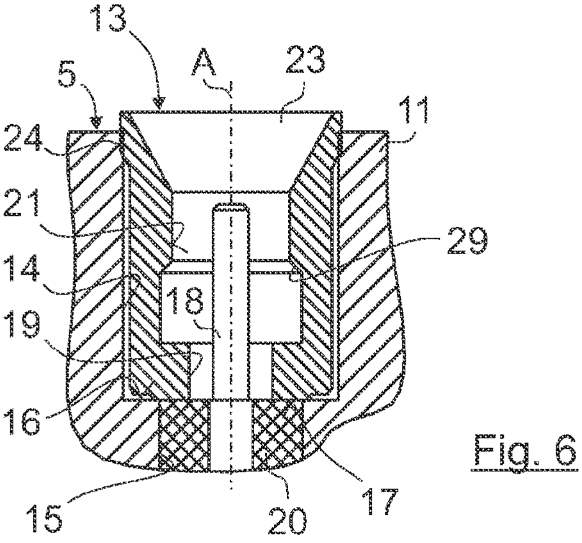
Figure 7:
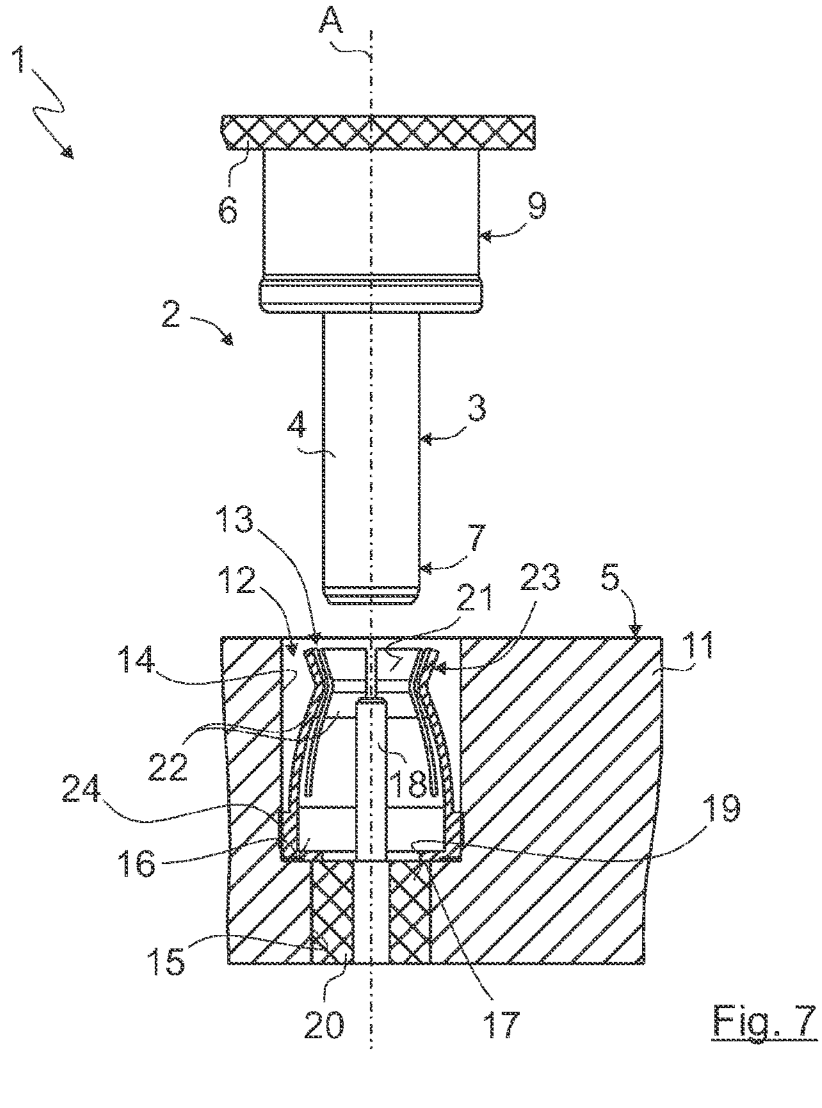

The figures show schematically:

FIG. 1 a signal transmission system, according to a first embodiment of the invention, in a sectional view;

FIG. 2 a connection arrangement, according to a second embodiment of the invention, in a sectional view;

FIG. 3 a connection arrangement, according to a third embodiment of the invention, in a sectional view;

FIG. 4 a connection arrangement, according to a fourth embodiment of the invention, in a sectional view;

FIG. 5 a top view of a hexagonal flange of the contact sleeve of the connection arrangement of the fourth embodiment;

FIG. 6 a connection arrangement, according to a fifth embodiment of the invention, in a sectional view; and FIG. 7 a signal transmission system, according to a sixth embodiment of the invention, in a sectional view.

FIG. 1 shows a signal transmission system 1 according to a first embodiment of the invention. The signal transmission system 1 comprises a connection arrangement 2 with a connecting element 3 (also known as "bullet"). The connecting element 3 has a rigid, tubular outer housing made of metal which is used as outer conductor 4. The connecting element 3 is configured to connect an electrical apparatus 5 to a PCB 6. Therefore, the connecting element 3 comprises an electrical plug-in connector 7 at a first end, for making connection to the electrical apparatus 5, and a secondary connector 8 at a second end for making connection to a counterpart connector 9 of the PCB 6. As the design and the configuration of the secondary connector 8 and the respective counterpart connector 9 are not essential for the underlying invention, these components will not further be discussed in the following. However, the secondary connector 8 and the counterpart connector 9 may preferably be designed as proposed in EP 3 627 636 A1.

The electrical apparatus 5 of the connection arrangement 2 comprises an electrical circuit 10 which is accommodated inside a respective housing 11. The electrical circuit 10 is schematically illustrated as second PCB but may generally consist of any composition of electronical components. The electrical circuit 10 may comprise an RF component, preferably a filter module, an amplifier module, a directional coupler module, or the like. The housing 11 of the electrical apparatus 5 is preferably made of metal, may be connected to an electrical reference potential of the electrical circuit 10, and may thus also provide a proper electromagnetic shielding for the electrical circuit 10.

The housing 11 has a recess 12 for insertion of a contact sleeve 13. In the application examples, the recess 12 of the housing 11 is a stepped bore, with a first bore section 14 for insertion of the contact sleeve 13 and a second bore section 15 for providing a mechanical passage to the electrical circuit 10. Because the first bore section 14 has a larger diameter than the second bore section 15, a step is provided between the first bore section 14 and the second bore section 15 which can act as an end stop for the contact sleeve 13. In addition, the step acts as s stop surface 16 inside the recess 12 and is used to electrically connect to a face sided outer contact surface 17 of the contact sleeve 13 when the contact sleeve 13 is fully inserted into the recess 12 (c. f., FIGS. 2-4, and 6-7).

Thus, the contact sleeve 13 is configured for insertion into the recess 12 of the housing 11 of the electrical apparatus 5, and comprises the face sided outer contact surface 17 at a first end facing in the insertion direction (c. f., arrows in FIG. 1) of the contact sleeve 13, in order to make an electrical contact with the housing 11 of the electrical apparatus 5 via the stop surface 16 inside the recess 12. The cross-sectional area of the contact sleeve 13 is reduced in the face sided outer contact surface 17, enabling a potential higher contact pressure when pressing the contact sleeve 13 against the stop surface 16 inside the recess 12.

The electrical apparatus 5 comprises an inner conductor 18 which is connected to the electrical circuit 10 and coaxially protruding through the second bore section 15 into the first bore section 14. The face sided outer contact surface 17 of the contact sleeve 13 has a through-hole 19 for providing a passage for the inner conductor 18, in order to make it accessible for the plug-in connector 7.

The electrical apparatus 5 further comprises a dielectric material 20 which is housed inside the second bore section 15, coaxially guiding the inner conductor 18.

When producing the connection arrangement 2, at least the following method steps may be performed:

providing the contact sleeve 13; and inserting the contact sleeve 13 into the recess 12 of the housing 11 of the electrical apparatus 5, such that the outer contact surface 17 makes an electrical contact with the housing 11 of the electrical apparatus 5 via a stop surface 16 inside the recess 12.

Preferably, the contact sleeve 13 is made in one piece. The contact sleeve 13 can be made of metal, preferably of brass, bronze or steel, and may optionally be coated with silver or gold.

The contact sleeve 13 further comprises a lateral inner contact surface 21 being configured to make an electrical contact with the outer conductor 4 of the electrical plug-in connector 7.

According to the first application example, the outer conductor 4 of the plug-in connector 7 is secured inside the contact sleeve 13 by frictional locking. Therefore, the lateral inner contact surface 21 is a plane cylindrical surface, and the contact sleeve 13 is mainly rigid. The outer conductor 4 comprises several spring tabs 22 which are circularly arranged around the outer conductor 4, to provide the frictional locking between the outer conductor 4 and the contact sleeve 13 due to the spring forces, pressing against the lateral inner contact surface 21, when the outer conductor 4 is inserted into the contact sleeve 13. However, there are also other possibilities to mechanically secure the connection between the contact sleeve 13 and the plug-in connector 7 of the connection arrangement 2, some of which will be described below.

The cross-section of the contact sleeve 13 can be designed for providing an impedance-matched transmission between the electrical apparatus 5 and the electrical plug-in connector 7. An appropriate profile/shape for the contact sleeve 13 can be derived from simulations and measurements, for example.

In order to simplify the insertion of the outer conductor 4 into the contact sleeve 13, the contact sleeve 13 has a funnel-shaped insertion section 23 for the insertion of the electrical plug-in connector 7.

There exist several possibilities for properly fixing the contact sleeve 13 inside the recess 12 of the housing 11. In the application examples as shown in FIGS. 1, 2, 6, and 7, the contact sleeve 13 is fixed inside the recess 12 by an interference fit via fixation projections 24. Alternative or additional fixation techniques will be described below.

The fully inserted contact sleeve 13 may protrude from the recess 12 of the housing 11, as can be seen in FIGS. 1, 3, and 6, for example. This can be especially beneficial if the contact sleeve 13 has to be pressed into the recess 12 via a pressing tool (not shown), in order to ensure that the contact sleeve 13 can be fully inserted into the recess 12 independent of potential manufacturing tolerances. However, as is shown in the second application example of FIG. 2, the contact sleeve 13 and/or the recess 12 may also be configured such that the contact sleeve 13 is flush with the surface of the housing 11 in its fully inserted state. In special cases, the contact sleeve 13 may even be recessed in the recess 12 when fully inserted, as shown in FIG. 7.

The third application example of FIG. 3 shows another possibility to fix the contact sleeve 13 inside the recess 12, as an alternative or supplement to an interference fit. In FIG. 3, the contact sleeve 13 is adhesively fixed inside the recess 12 with a glue 25, preferably a conductive adhesive.

FIGS. 4 and 5 show a third possibility to mechanically fix the contact sleeve 13 inside the recess 12 by using a threaded connection. Therefore, the contact sleeve 13 has an external thread 26 on its outer surface, and the recess 12 has a corresponding internal thread 27. In order to transmit the torque of a screwdriving tool to the contact sleeve 13, the contact sleeve 13 may have a flange 28 or the like. In the application example of FIGS. 4 and 5, the contact sleeve 13 has a hexagonal flange 28 at its second end.

As already mentioned above, there are several possibilities in order to secure the connection between the plug-in connector 7 and the contact sleeve 13 besides the frictional locking with the outer conductor 4 having the spring tabs 22.

As can be seen in FIG. 6, the lateral inner contact surface 21 of the contact sleeve 13 may comprise an undercut 29, preferably a ring-shaped undercut 29. The outer conductor 4 thus may comprise at least one latching protrusion to provide a form-fit with the undercut 29 of the inner contact surface 21 of the contact sleeve 13 for securing the outer conductor 4 inside the contact sleeve (not shown).

In addition, as an alternative or supplement to the outer conductor 4 having spring tabs 22, the contact sleeve 13 may comprise spring tabs 22. Preferably, the contact sleeve 13 comprises a plurality of spring tabs 22 which are circularly arranged inside the contact sleeve 13, wherein the inner contact surface 21 is arranged and distributed over the plurality of spring tabs 22, as shown in FIG. 7. The spring tabs 22 are attached to the inside of the contact sleeve 13 at one respective end and extend towards the middle axis A of the contact sleeve 13 with the other, freely movable end. Still, the contact sleeve 13 can be made in one piece.

It shall be emphasized that the contact sleeve 13 and also the connectors 7, 8, 9 may have any geometric form that seems suitable. The round cross-section shall only be understood as one example.

The invention claimed is:

1. A connection arrangement comprising:
a contact sleeve; and
an electrical apparatus including a housing and an electrical circuit arranged inside the housing,
wherein the contact sleeve is configured for insertion into a recess of the housing of the electrical apparatus,
wherein the electrical circuit comprises electrical components beyond the recess of the housing,
wherein the contact sleeve comprises a lateral inner contact surface and a face-sided outer contact surface,
wherein the lateral inner contact surface is configured to make an electrical contact with an outer conductor of an electrical plug-in connector,
wherein the face-sided outer contact surface is-configured-to-makes an electrical contact with the housing of the electrical apparatus via a stop surface inside the recess of the housing.

2. The connection arrangement according to claim 1, wherein the lateral inner contact surface is a plane cylindrical surface with constant inner diameter.

3. The connection arrangement according to claim 1, wherein the lateral inner contact surface comprises a ring-shaped-undercut.

4. The connection arrangement according to claim 1, wherein the contact sleeve comprises at least one spring tab, and
wherein the lateral inner contact surface is arranged on the at least one spring tab.

5. The connection arrangement according to claim 4, wherein the contact sleeve comprises a plurality of spring tabs which are circularly arranged inside the contact sleeve, and
wherein the lateral inner contact surface is arranged and distributed over the plurality of spring tabs.

6. The connection arrangement according to claim 1, wherein the cross-sectional area of the contact sleeve is reduced in the face-sided outer contact surface.

7. The connection arrangement according to claim 1, wherein the face-sided outer contact surface has a through-hole for providing a passage for an inner conductor of the electrical apparatus or for an inner conductor contact element of the plug-in connector.

8. The connection arrangement according to claim 1, wherein the contact sleeve has a hexagonal flange at an end opposite to the face-sided outer contact surface.

9. The connection arrangement according to claim 1, wherein the contact sleeve has a funnel-shaped insertion section for an insertion of the electrical plug-in connector.

10. The connection arrangement according to claim 1, wherein the contact sleeve is made in one piece.

11. The connection arrangement according to claim 1, wherein the contact sleeve is coated with a coating material that has a higher conductivity than conductivity of a base material of the contact sleeve.

12. The connection arrangement according to claim 1, wherein an outer shell surface of the contact sleeve mechanically connects to an inner surface of the recess of the housing.

13. The connection arrangement according to claim 1, wherein the electrical circuit comprises a radio-frequency component.

14. The connection arrangement according to claim 1, wherein the recess of the housing is a stepped bore, with the stepped bore having a first bore section for insertion of the contact sleeve and a second bore section for providing a mechanical passage to the electrical circuit,
wherein the first bore section has a larger diameter than the second bore section, and
wherein the stop surface is a step between the first bore section and the second bore section.

15. The connection arrangement according to claim 14, wherein the electrical apparatus comprises an inner conductor, the inner conductor being connected to the electrical circuit and coaxially protruding through the second bore section into the first bore section.

16. The connection arrangement according to claim 15, wherein the electrical apparatus comprises a dielectric material, the dielectric material being housed inside the second bore section, and
wherein the inner conductor is coaxially guided through the dielectric material.

17. The connection arrangement according to claim 1, wherein the housing is made of metal.

18. The connection arrangement according to claim 1, wherein the contact sleeve protrudes from the recess of the housing.

19. A signal transmission system comprising:
a connection arrangement that includes
a contact sleeve,
an electrical plug-in connector, and
an electrical apparatus,
wherein the electrical apparatus includes a housing and an electrical circuit arranged inside the housing,
wherein the contact sleeve is configured for insertion into a recess of the housing of the electrical apparatus, and wherein the contact sleeve includes a lateral inner contact surface and a face-sided outer contact surface, the inner contact surface making an electrical contact with an outer conductor of the electrical plug-in connector, and the face-sided outer contact surface making an electrical contact with the housing of the electrical apparatus via a stop surface inside the recess;

a printed circuit board having a counterpart connector; and a connecting element for connecting the electrical apparatus to the printed circuit board, wherein the electrical plug-in connector is arranged at a first end of the connecting element for connecting to the electrical apparatus, and wherein the connecting element comprises a secondary connector at a second end for connecting to the counterpart connector of the printed circuit board.

20. A method for producing a connection arrangement, the method comprising the steps of:

providing a contact sleeve having a lateral inner contact surface and a face-sided outer contact surface, the inner contact surface being configured to make an electrical contact with an outer conductor of an electrical plug-in connector; and inserting the contact sleeve into a recess of a housing of an electrical apparatus, such that the face-sided outer contact surface makes an electrical contact with the housing of the electrical apparatus via a stop surface inside the recess.

* * * * *